Patented Nov. 20, 1928.

1,692,698

UNITED STATES PATENT OFFICE.

WILLIAM JACKSON POPE, OF CAMBRIDGE, ENGLAND, ASSIGNOR TO THE BRITISH DRUG HOUSES LIMITED, OF LONDON, ENGLAND, A BRITISH COMPANY.

PHARMACEUTICAL PRODUCT.

No Drawing. Original application filed March 18, 1926, Serial No. 95,785, and in Great Britain July 28, 1925. Divided and this application filed December 7, 1926, Serial No. 153,211. Renewed September 11, 1928.

This invention relates to the manufacture of compounds for producing local anæsthesia which are of higher efficiency than that of the anæsthetic bases and their salts commonly used or known to be useful for the purpose.

Salts of naturally occurring alkaloids, as for example cocaine, and of certain organic basic substances, which are prepared artificially, as for example ethocaine (di-ethyl-amino-ethyl-para-amino-benzoate), are in extensive use as anæsthetics. The acids in general chosen for the preparation of these salts are such as yield easily soluble and well-characterized salts.

It has been discovered that the borates of such natural or synthetic anæsthetic bases exert a far greater anæsthetic effect when applied in solution to a sensitive surface, such as that of the eye, nose, throat or ureter, than do solutions of the salts commonly used.

The chemical composition of these borates is such that one molecular proportion of the alkaloid or base is associated with five atomic proportions of boron, in the form of a complex boric acid, and in certain cases, especially if acetone is used in their preparation, solvent of crystallization may be included in their composition.

My invention relates to those borates of natural or synthetic bases exercising anæsthetic effect which are the products of my invention and are hereinafter defined and included in the expression "borates of anæsthetic bases".

These borates are made by double decomposition of the sulphate of the base with a barium salt of boric acid.

By this method the sulphate of the base is mixed with an excess of a barium borate to remove the sulphuric acid from the sulphate of the base. The barium sulphate is filtered and thoroughly washed with alcohol. The clear filtrate is evaporated to a very low volume or to dryness and then thoroughly washed with acetone, or other suitable solvent, to give the desired borate.

The invention is illustrated by the following examples, but the invention is not limited thereto. The parts are by weight.

*Example 1.*—Amydricaine (tetramethyl-diaminodimethyl ethyl carbinyl benzoate) borate.

One part of amydricaine (tetramethyldiaminodimethyl ethyl carbinyl benzoate) base, of which the structural formula is:

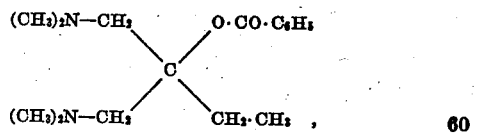

is dissolved in N-sulphuric acid (3.2 parts approximately) and this solution is added to an aqueous suspension of a barium borate prepared by mixing 1.05 parts of crystalline barium hydroxide with 0.83 parts of boric acid. After warming for a short time the insoluble material is filtered and washed with warm alcohol. The filtrate and washings are mixed and evaporated and the residue is washed with acetone. The product so obtained has a $P_H$ value of about 8.2 when freshly diluted with about 50 volumes of water, using phenol red solution as an indicator.

*Example 2.*—Ethocaine (diethylamino-ethyl-para-amino-benzoate) borate.

1.27 parts of ethocaine base, of which the structural formula is:

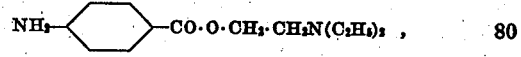

is dissolved in N-sulphuric acid (5 parts approximately), and this solution is added to an aqueous suspension of a barium borate prepared by mixing 1.57 parts by weight of crystalline barium hydroxide with 1.24 parts by weight of boric acid. After warming for a short time the insoluble material is filtered and washed with warm alcohol. The filtrate and washings are mixed and evaporated, and the residue is washed with acetone, filtered, washed with more acetone, and dried. The $P_H$ value of this material is also about 8.2 when tested in the manner described above.

*Example 3.*—Benzamine (benzoyl vinyl diacetonalkamine) borate.

2.47 parts of benzamine base, of which the structural formula is:

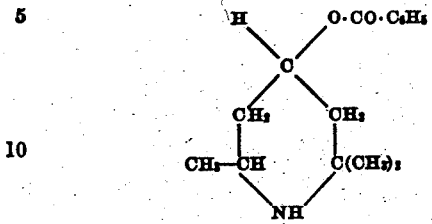

are dissolved in N-sulphuric acid (10 parts approximately), and this solution is added to an aqueous suspension of a barium borate prepared by mixing 3.15 parts of crystalline barium hydroxide with 2.48 parts of boric acid. After warming for a short time the insoluble material is separated and washed with warm alcohol. The filtrate and washings are mixed and evaporated and the residue is washed with acetone, the solid separated and washed with more acetone. The $P_H$ value of the material so obtained is also about 8.2 when tested in the manner described above, again using phenol red as an indicator.

*Example 4.*—Butyn (dibutylaminopropyl para-aminobenzoate) borate.

The preparation of this substance is carried out in a similar way, except that an equivalent of butyn base, of which the structural formula is:

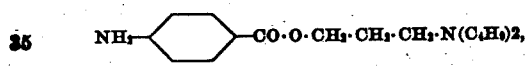

is used in place of the other base mentioned. The $P_H$ value of this salt is about 7.6 when freshly diluted with about 50 volumes of ordinary distilled water and using phenol red solution as indicator, the same method of testing being adopted as in the previous examples.

In a similar manner, one may prepare:

From cocaine (benzoyl methyl ecgonine), of which the structural formula is

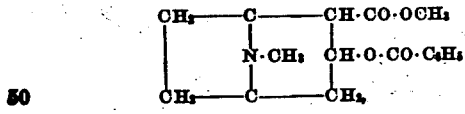

cocaine borate, the $P_H$ value being about 7.0, using bromothymol blue as the indicator, and when freshly diluted with about 50 volumes of ordinary distilled water;

From amylocaine base, of which the structural formula is

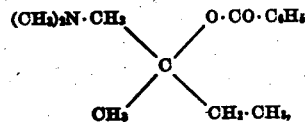

amylocaine (dimethylaminomethyl methyl ethyl carbinyl benzoate) borate having a $P_H$ value of about 8.0, using phenol red solution as indicator, under the conditions described for the previously mentioned borates;

From glycocaine base, of which the structural formula is

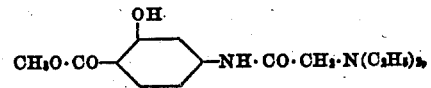

glycocaine (methyl diethylamino-acetyl-para-amino-ortho-hydroxy-benzoate) borate, having a $P_H$ value of about 7.6, using phenol red solution as indicator, and using the same dilution as before, and observing similar conditions;

From benzocaine base, of which the structural formula is

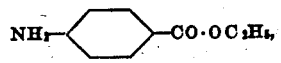

benzocaine (ethyl para-amino-benzoate) borate, having a $P_H$ value of about 6.1 using bromothymol blue solution as indicator;

From phenocaine base, of which the structural formula is

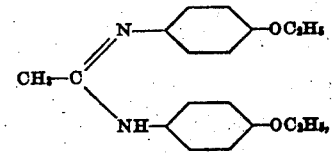

phenocaine (di-para-phenetyl ethenylamidine) borate, having a $P_H$ value of about 7.3, using phenol red as indicator.

Having thus described the nature of the said invention and the best means I know of carrying the same into practical effect, I claim:—

1. A process for the manufacture of borates of anæsthetic bases which consists in bringing together in a liquid an anæsthetic base in the form of sulphate and boric acid in the form of a barium compound.

2. A process for the manufacture of borates of anæsthetic bases which consists in bringing together an aqueous solution of an anæsthetic base sulphate and a suspension of a borate of barium.

3. A process for the manufacture of a borate of ethocaine (di-ethyl-amino-ethyl-para-amino-benzoate) which consists in bringing together in a liquid ethocaine (di-ethyl-amino-ethyl-para-amino-benzoate) in the form of sulphate and boric acid in the form of a barium compound.

4. A process for the manufacture of a borate of ethocaine (di-ethyl-amino-ethyl-para-amino-benzoate) which consists in bringing together an aqueous solution of ethocaine (di-ethyl-amino-ethyl-para-amino-benzoate) sulphate and a suspension of a borate of barium.

In testimony whereof I have signed my name to this specification.

WILLIAM JACKSON POPE.